W. H. JOHNSON.
GOVERNOR FOR BOTTLE OR OTHER FEEDERS.
APPLICATION FILED FEB. 9, 1914.

1,118,425.

Patented Nov. 24, 1914.

WITNESSES:
Frank A. Fahle
Josephine Gasper

INVENTOR
William H. Johnson,
BY
Arthur M. Hood
ATTORNEY

UNITED STATES PATENT OFFICE.

WILLIAM H. JOHNSON, OF TERRE HAUTE, INDIANA, ASSIGNOR TO AUTOMATIC MACHINERY COMPANY, OF TERRE HAUTE, INDIANA, A CORPORATION OF INDIANA.

GOVERNOR FOR BOTTLE OR OTHER FEEDERS.

1,118,425.  Specification of Letters Patent.  Patented Nov. 24, 1914.

Application filed February 9, 1914. Serial No. 817,456.

*To all whom it may concern:*

Be it known that I, WILLIAM H. JOHNSON, a citizen of the United States, residing at Terre Haute, in the county of Vigo and State of Indiana, have invented a new and useful Governor for Bottle or other Feeders, of which the following is a specification.

The object of my invention is to provide an apparatus by means of which the delivery of fragile articles, such as bottles, to a filling machine or a sealing machine, or any other mechanism for handling bottles, may be accurately accomplished. While the mechanism has been primarily designed for handling fragile articles such as glass bottles, it will, of course, be understood that the same mechanism will be equally applicable for use in the delivery of cans or other receptacles or articles to any mechanism designed to receive and handle the same.

The accompanying drawings illustrate my invention.

Figure 1:
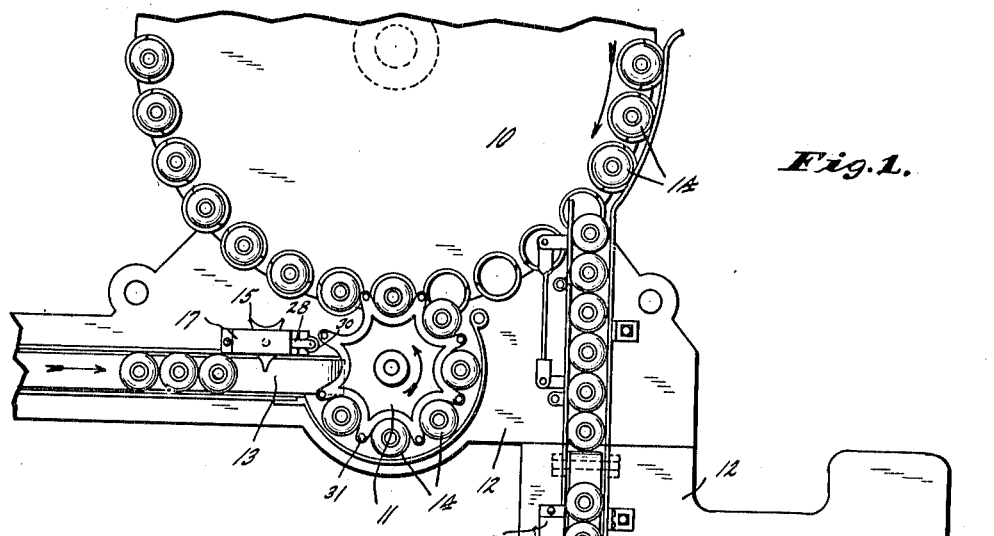
Figure 2:
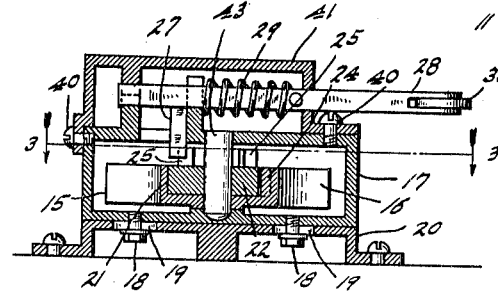
Figure 3:
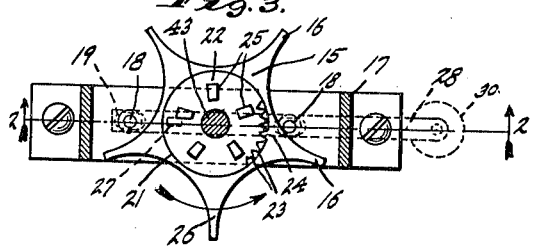

Figure 1 is a plan showing in a fragmentary manner the rotary bottle carrying table of a filler or sealer, an intermediate feeder star wheel, a delivery belt for propelling the bottles toward the star wheel, and my device which is in the nature of a timer or governor by means of which the delivery of the bottle to the star wheel is definitely controlled by the bottle itself; Fig. 2 a longitudinal section on line 2—2 of Fig. 3; Fig. 3 a horizontal section on line 3—3 of Fig. 2.

In the drawings, 10 indicates the rotary table of a filler, crowner or other machine to which the packages are to be delivered, 11 the star wheel commonly utilized for the direct delivery of the packages to the table 10, the star wheel being connected to the table 10 so as to rotate in exact synchronism therewith. There is no difficulty in delivering bottles or other packages from the star wheel to the rotary table but the difficulty resides in the delivery of the bottles to the star wheel in such manner as to prevent crushing of the same in case the delivery is not exactly accurate. The star wheel 11 rotates over a stationary table 12 and running to and over this table beneath the star wheel 11 is an endless belt 13 which is in constant motion during the operation of the machine and by means of which the bottles 14 are delivered to the table 12.

In order to insure the proper delivery of each bottle to a pocket in the star wheel 11, it is essential that there be exact synchronism between the time of arrival of a bottle upon table 12 and the time of arrival of a pocket of the star wheel at that point and as the bottles arriving upon the belt are not necessarily exactly and accurately spaced, I provide the governor which forms the essential feature of my invention. This governor comprises, as its main element, a bottle detent which extends over the feed belt and is wholly dependent, for its motion, upon a single bottle carried by the belt. In the present form of my invention, this detent is in the form of a rotary wheel or disk 15 provided with a plurality of radially extending arms 16. The disk 15 is rotatably mounted in a body 17 which, by means of the clamping screws 18 and slots 19 in a base plate 20, may be laterally and longitudinally adjusted relative to the feed belt so as to accurately position the radially extending arms of the detent relative to the pockets of the star wheel. The disk 15 is provided in its upper surface with a circular pocket 21 in which is loosely mounted a pin disk 22 provided in its circumference with a plurality of teeth 23 interengaging with a tooth 24 carried by the disk 15, the arrangement being such that desired angular adjustment between the wheel and disk may be obtained so that the angular relationship of the radially projecting arms relative to the feed belt may be accurately adjusted. The pin disk 22 is provided with a plurality of pins 25, one for each arm 16, and arranged above the disk is a stop pin 27 carried by a plunger 28 and normally held in the path of movement of pins 25 by means of a spring 29. The plunger 28 is provided at its free end with a roller 30 which is arranged in the path of movement of a plurality of pins 31 carried by the star wheel 11, there being as many of these pins as there are pockets in the star wheel and the arrangement being such that the plunger 28 will be shifted at each advancement of the star wheel just sufficient to withdraw stop pin 27 momentarily from in front of the adjacent pin 25. The time during which the movement of the plunger takes place is comparatively very small so that if there is no bottle immediately in contact with the active detent arm 26 at the moment of withdrawal of the stop pin 27 the said stop pin will return to a position in front of the adjacent finger 25 and prevent any advancement of the oncoming bottle until the next pocket of the star wheel 11 is in position to reach its receiving position at the time of arrival of a bottle. In practice I find that the timing of the parts should be such that the stop pin 27 will get back in restraining position before a bottle can move forwardly toward the active detent finger as much as half an inch.

If a bottle is in proper position against the active detent finger, there will be no forward movement of the bottle so long as the stop finger 27 is in its normal position, but just as soon as the plunger is moved from its normal position, the stop pin 27 will be withdrawn from in front of one of the fingers 25 and immediately the bottle which has up to that time been restrained, is driven forwardly, this forward movement shifting the detent wheel into position to lie in front of the next oncoming bottle and the forward movement of the bottle starting just in time to reach the table 12 in synchronism with the arrival of a bottle receiving notch of the star wheel. By this arrangement the delivery of the successive bottles to the star wheel will be accurately gaged and no breakages can occur.

In order that my attachment may be utilized with either right or left hand machines, I have constructed the supporting body symmetrical with relation to the axis of the detent disk and, by removing screws 40, 40 the frame 41, which carries the plunger 28 may be withdrawn, whereupon the pivot pin 43 of the disk may be readily extracted and the disk drawn laterally so as to permit any adjustments of the disk and pin plate. The detent disk extends laterally upon each side of the main body and thus the apparatus may be placed upon either the right or lefthand side of the feed belt.

I claim as my invention:

1. A delivery apparatus comprising a movable carrier, provided with a multiplicity of article-receiving pockets, a carrier arranged to deliver articles laterally to said pockets, a detent normally projected over said last-mentioned carrier and movable from that position only by the action of an article carried by said carrier, a stop member normally serving to prevent forward movement of the detent under the action of an article, and means operated intermittently by the first mentioned carrier for temporarily withdrawing said stop from normal position.

2. In a delivery apparatus comprising a movable carrier provided with a multiplicity of article-receiving pockets, a carrier arranged to deliver articles laterally to said pockets, a rotary detent arranged adjacent said last-mentioned carrier and provided with a plurality of radially extending article-stopping arms successively projectable over said last mentioned carrier by rotation of the detent, a series of projections corresponding with the detent arms carried by a member angularly adjustable relative to the rotary detent, a stop member normally arranged in the path of movement of said projections to prevent forward movement of the detent under the action of an article on the last-mentioned carrier, and means operated intermittently by the first-mentioned carrier for temporarily withdrawing said stop from normal position.

3. In a delivery apparatus comprising a movable carrier provided with a multiplicity of article-receiving pockets, a carrier arranged to deliver articles laterally to said pockets, a rotary detent arranged adjacent said last-mentioned carrier and provided with a plurality of radially extending article-stopping arms successively projectable over said last-mentioned carrier by rotation of the detent, a series of projections corresponding with the detent arms carried by the rotary detent, a stop member normally arranged in the path of movement of said projections to prevent forward movement of the detent under the action of an article on the last-mentioned carrier, and means operated intermittently by the first-mentioned carrier for temporarily withdrawing said stop from normal position.

4. In a delivery apparatus, an article-carrying member comprising a supporting body, a rotary detent provided with a plurality of radially extending arms, a carrier for said rotary detent, means for connecting said carrier and supporting body whereby the carrier may be laterally adjusted, a plunger arranged adjacent the rotary detent, a stop finger connected with said plunger, and a plurality of projections carried by the detent and traveling in a path within which said stop finger normally lies.

5. In a delivery apparatus, an article-carrying member comprising a supporting body, a rotary detent provided with a plurality of radially extending arms, a carrier for said rotary detent, means for connecting said carrier and supporting body whereby the carrier may be laterally adjusted, a plunger arranged adjacent the rotary detent, a stop finger connected with said plunger, and a plurality of projections carried by the detent and traveling in a path within which said stop finger normally lies, said projections being carried by a plate coaxial with the rotary detent and angularly adjustable thereon.

In witness whereof, I, WILLIAM H. JOHNSON have hereunto set my hand at Terre Haute, Indiana, this sixth day of February, A. D. one thousand nine hundred and fourteen.

WILLIAM H. JOHNSON.

Witnesses:
H. H. DRONBERGER,
CLARENCE I. HALL.